(12) United States Patent
Yasuda et al.

(10) Patent No.: US 10,774,242 B2
(45) Date of Patent: Sep. 15, 2020

(54) TRANSFER SHEET, AND DECORATIVE FILM, AND METHOD FOR PRODUCING SAME

(71) Applicant: 3M INNOVATIVE PROPERTIES COMPANY, St. Paul, MN (US)

(72) Inventors: Daigo Yasuda, Tokyo (JP); Yorinobu Takamatsu, Sagamihara (JP); Minori Kawagoe, Sagamihara (JP); Akihiko Nakayama, Gotemba (JP)

(73) Assignee: 3M Innovative Properties Company, St. Paul, MN (US)

( * ) Notice: Subject to any disclaimer, the term of this patent is extended or adjusted under 35 U.S.C. 154(b) by 160 days.

(21) Appl. No.: 15/528,856

(22) PCT Filed: Dec. 21, 2015

(86) PCT No.: PCT/US2015/067081
§ 371 (c)(1),
(2) Date: May 23, 2017

(87) PCT Pub. No.: WO2016/106208
PCT Pub. Date: Jun. 30, 2016

(65) Prior Publication Data
US 2017/0326906 A1 Nov. 16, 2017

(30) Foreign Application Priority Data
Dec. 24, 2014 (JP) .................. 2014-261371

(51) Int. Cl.
*B44C 1/17* (2006.01)
*B32B 7/12* (2006.01)
(Continued)

(52) U.S. Cl.
CPC .............. *C09J 5/06* (2013.01); *B32B 7/12* (2013.01); *B32B 27/40* (2013.01); *B44C 1/1704* (2013.01); *B44C 1/1708* (2013.01); *C09J 7/29* (2018.01)

(58) Field of Classification Search
CPC ......... B44C 1/1704; B44C 1/1708; C09J 5/06
See application file for complete search history.

(56) References Cited

U.S. PATENT DOCUMENTS 4,012,552 A * 3/1977 Watts ....................... B41M 3/12
156/233
4,387,129 A * 6/1983 Vincent .................. B32B 27/08
428/195.1
(Continued)

FOREIGN PATENT DOCUMENTS

EP 0 554 546 8/1993
EP 0 714 762 6/1996
(Continued)

OTHER PUBLICATIONS

Machine translation JP-61162389-A. (Year: 1986).*

*Primary Examiner* — Alexandre F Ferre
(74) *Attorney, Agent, or Firm* — Philip P. Soo

(57) ABSTRACT

A design transfer sheet of one embodiment of the present disclosure contains a release layer and a design transfer layer releasably mounted on the release layer, and the design transfer layer contains a thermally adherable first surface layer and a thermally adherable second surface layer in that order from the release layer side.

6 Claims, 2 Drawing Sheets

(51) Int. Cl.
*B32B 27/40* (2006.01)
*C09J 5/06* (2006.01)
*C09J 7/29* (2018.01)

(56) References Cited

U.S. PATENT DOCUMENTS

| | | | | |
|---|---|---|---|---|
| 5,104,938 | A * | 4/1992 | Toyama | C08L 53/025 525/92 C |
| 6,346,313 | B1 * | 2/2002 | Cook | B41M 5/0256 428/143 |
| 2010/0243140 | A1 * | 9/2010 | Sloan | B44C 1/175 156/230 |
| 2011/0070409 | A1 * | 3/2011 | Nishimaki | B32B 27/40 428/190 |
| 2014/0342112 | A1 | 11/2014 | Gruber | |

FOREIGN PATENT DOCUMENTS

| | | | | |
|---|---|---|---|---|
| JP | 61162389 A * | 7/1986 | | B41M 5/26 |
| JP | 1999(H11)-302528 | 11/1999 | | |
| JP | 2000-211090 | 8/2000 | | |
| JP | 2005-262591 | 9/2005 | | |
| JP | 2007-277485 A | 10/2007 | | |
| JP | 2009-035588 | 2/2009 | | |
| JP | 2009-197124 | 9/2009 | | |
| JP | 2011-208041 | 10/2011 | | |
| JP | 2014-128922 | 7/2014 | | |
| JP | 2014-159126 | 9/2014 | | |

* cited by examiner

TRANSFER SHEET, AND DECORATIVE FILM, AND METHOD FOR PRODUCING SAME

Cross Reference to Related Applications

This application is a national stage filing under 35 U.S.C. 371 of PCT/US2015/067081, filed 21 Dec. 2015, which claims the benefit of JP Patent Application No. 2014-261371, filed 24 Dec. 2014, the disclosures of which are incorporated by reference in their entirety herein.

FIELD OF THE INVENTION

The present disclosure relates to design transfer sheets, in particular to a design transfer sheet capable of imparting a design to a decorative film, and to a decorative film containing a partial structure of such a design transfer sheet, and to a method for producing the same.

BACKGROUND ART

Decorative films such as those for interior decorative materials used to decorate the interior parts of automobiles are effective in improving a work environment because there are no volatile organic compounds (VOC) or any spray mist. Such a decorative film generally has an outermost layer, which protects the decorative film and the article adhered to by the decorative film, and, between the outermost layer and an adhesive layer for mounting the decorative film on the article, a substrate layer serving as the support of the decorative film, a design layer such as gravure printing, and a metal vapor deposition film of as tin or the like, and, between these layers or films, for example, between the design layer and the metal vapor deposition film, has a bonding layer which bonds them.

Japanese Unexamined Patent Application Publication No. 2009-035588 describes "an adhesive film comprising a substrate and an adhesive layer on the substrate, the adhesive layer comprising (A) a (meth)acrylic polymer containing a carboxyl group, in which the proportion of the number of repeating units containing a carboxyl group relative to the total number of repeating units of the polymer is from 4.0 to 25%, and having a glass transition temperature (Tg) of not higher than 25° C., and (B) a (meth)acrylic polymer containing an amino group, in which the proportion of the number of repeating units containing an amino group relative to the total number of repeating units of the polymer is from 3.5 to 15%, and having a glass transition temperature (Tg) of not lower than 75° C., wherein the blending ratio of component (A) and component (B) is from 62:38 to 75:25 by weight."

SUMMARY OF THE INVENTION

When producing a decorative film, the design layer is printed on a substrate layer, an outermost layer or the like by gravure printing or the like, and then laminated via a bonding layer with other layers that constitute the decorative film. However, if the design layer is directly printed, the substrate layer or the like that serves as the base on which the design layer is printed must be printing-resistant, such as being heat-resistant and solvent-resistant, and therefore, there are sometimes restrictions on the selection of the material of the substrate layer and the like.

Furthermore, the design layer cannot be formed independently from the other layers that constitute the decorative film, and production of the decorative film requires multi-stage serial processes. Such multi-stage serial processes sometimes reduce the yield of the decorative film.

The present disclosure provides a design transfer sheet that enables a design to be easily imparted to a variety of decorative films and enables improvement of yield and productivity in the production of decorative films.

One embodiment of the present disclosure provides a design transfer sheet including: a release layer; and a design transfer layer releasably mounted on the release layer, the design transfer layer including a thermally adherable first surface layer and a thermally adherable second surface layer in that order from the release layer side.

Another embodiment of the present disclosure provides a decorative film including the design transfer layer, a substrate layer disposed on the side of either the first surface layer or the second surface layer of the design transfer layer, and an outermost layer disposed on the outermost surface on the side of the other of the first surface layer or the second surface layer of the design transfer layer.

Another embodiment of the present disclosure provides a decorative film capable of covering an article having a three-dimensional shape by heat expansion, the decorative film including: a design transfer layer; a polyurethane thermal adhesive layer, which is disposed on the side of either a first surface layer or a second surface layer of the design transfer layer and is thermally adhered to the article during the heat expansion; and an outermost layer disposed on the outermost surface on the side of the other of the first surface layer or the second surface layer of the design transfer layer; the polyurethane thermal adhesive layer containing thermoplastic polyurethane selected from the group consisting of polyester-based polyurethanes and polycarbonate-based polyurethanes; the fracture strength of the polyurethane thermal adhesive layer being not less than 1 MPa at 135° C.; the storage modulus at 150° C. and frequency 1.0 Hz being from $5 \times 10^3$ Pa to $5 \times 10^5$ Pa; and the coefficient of loss tan δ being not less than 0.1.

Another embodiment of the present disclosure provides a method for producing a decorative film, the method including the steps of: preparing a design transfer layer containing a thermally adherable first surface layer and a thermally adherable second surface layer; thermally adhering the first surface layer with a first article; and thermally adhering the second surface layer with a second article.

Because the design transfer sheet of the present disclosure has a thermally adherable first surface layer and a thermally adherable second surface layer, it can easily impart a design to a decorative film formed from a variety of materials, while at the same time the other two layers that constitute the decorative film can be bonded by a design transfer layer.

Additionally, because the design transfer sheet can be prepared in parallel with the preparation of the other layers of the decorative film, yield and productivity in the production of decorative films can be improved by using the design transfer sheet of the present disclosure.

Note that the above descriptions should not be construed as disclosing all embodiments of the present invention or all advantages pertaining to the present invention.

DESCRIPTION OF MODES FOR CARRYING OUT THE INVENTION

A detailed description for the purpose of illustrating representative embodiments of the present invention is given below, but these embodiments should not be construed as limiting the present invention.

In the present disclosure, "(meth)acrylic" refers to "acrylic or methacrylic," and "(meth)acrylate" refers to "acrylate or methacrylate."

In the present disclosure, "storage modulus" is the shear storage modulus G' when viscoelasticity measurement is performed in shear mode at frequency 1.0 Hz at a prescribed temperature using a dynamic viscoelasticity measurement device. "Coefficient of loss (tan δ)" is the ratio of shear loss modulus G"/shear storage elastic modulus G'.

The design transfer sheet of one embodiment of the present disclosure includes a release layer and a design transfer layer releasably mounted on the release layer, the design transfer layer containing a thermally adherable first surface layer and a thermally adherable second surface layer in that order from the release layer side.

Figure 1:
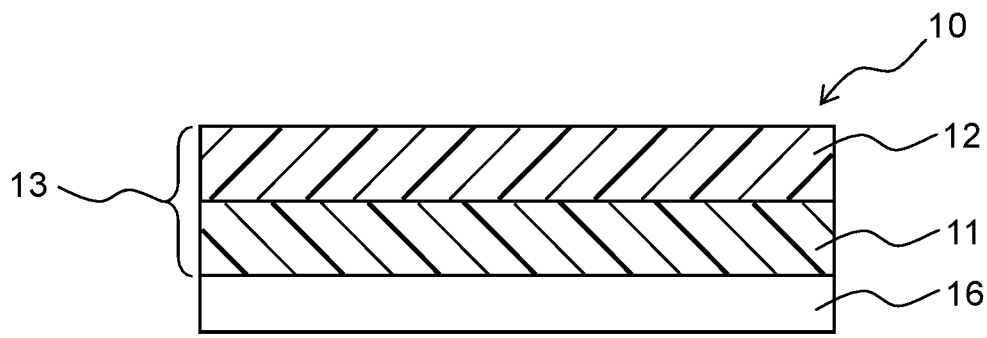
FIG. 1 is a cross-sectional view of a design transfer sheet according to an embodiment of the present disclosure.

FIG. 1 is a cross-sectional view of a design transfer sheet 10 of one embodiment of the present disclosure. The design transfer sheet 10 contains a release layer 16 and a design transfer layer 13, the design transfer layer 13 containing a thermally adherable first surface layer 11 and a thermally adherable second surface layer 12 in that order from the release layer 16 side. In this embodiment, the first surface layer 11 or the second surface layer 12, or both the first surface layer 11 and second surface layer 12, are designable layers that contain pigments, printing inks and the like.

As the release layer, any suitable release liner can be used. Examples of typical release liners include those prepared from paper (for example, kraft paper), and polymer materials (for example, polyolefins such as polyethylene and polypropylene, and polyesters such as ethylene vinyl acetate, polyurethane and polyethylene terephthalate and the like). The release liner may be coated as necessary with a layer of release agent such as a silicone-based material or fluorocarbon-based material.

The thickness of the release layer is generally not less than approximately 5 μm, approximately 15 μm, or approximately 25 μm, and not greater than approximately 300 μm, approximately 200 μm, or approximately 150 μm. Due to the thickness of the release layer being in the above range, the release layer can also function as a support of the design transfer layer, and ease of handling of the design transfer sheet can be improved.

The thermally adherable first surface layer and second surface layer of the design transfer layer generally contain a thermoplastic resin that softens and exhibits fluidity when heated. The thermoplastic resin may be one type alone or a mixture or blend of two or more types. The glass transition temperature and storage modulus of the thermoplastic resin may be selected as appropriate according to the transfer temperature of the design transfer layer and the application of the final product into which the design transfer layer is incorporated. If the thermoplastic resin is a mixture or blend of two or more types, the glass transition temperature and storage modulus indicate the values measured for the mixture or blend. Depending on the type of material that the first surface layer and second surface layer contact, the thermoplastic resins thereof may be the same or different. Examples of the material that these surface layers contact include polymeric resins such as acrylic resin, acrylonitrile/butadiene/styrene copolymer (ABS) resin, polycarbonate resin, polyester resin, and mixtures, blends and combinations thereof, and metals such as tin, indium and the like, and oxides and alloys of these metals.

The glass transition temperature of the thermoplastic resin may generally be not less than approximately −60° C., preferably not less than approximately −30° C., more preferably not less than approximately 0° C., and even more preferably not less than approximately 20° C., and not greater than approximately 150° C., not greater than approximately 125° C., or not greater than approximately 100° C. Due to the glass transition temperature of the thermoplastic resin being not less than approximately −60° C., excellent adhesive properties can be imparted to the design transfer sheet. Due to the glass transition temperature of the thermoplastic resin being not greater than approximately 150° C., the transferability of the design transfer sheet can be further improved. In the present disclosure, the glass transition temperature of the thermoplastic resin is defined as the peak temperature of the coefficient of loss tan δ (=shear loss modulus G"/shear storage modulus G') obtained by measuring shear storage modulus G' and shear loss modulus G" every 12 seconds in shear mode at frequency 1.0 Hz, while raising the temperature from −60° C. to 200° C. at a heating rate of 5° C./minute using a dynamic viscoelasticity measurement device.

The storage modulus of the thermoplastic resin at 50° C. can generally be not less than approximately $1.0 \times 10^5$ Pa, preferably not less than approximately $2.0 \times 10^6$ Pa, and more preferably not less than approximately $5.0 \times 10^6$ Pa, and not greater than approximately $1.0 \times 10^{10}$ Pa or not greater than approximately $5.0 \times 10^9$ Pa. Due to the storage modulus of the thermoplastic resin at 50° C. being not less than approximately $2.0 \times 10^6$ Pa, blocking properties of the design transfer sheet can be improved. Due to the storage modulus of the thermoplastic resin at 50° C. being not greater than approximately $1.0 \times 10^{10}$ Pa, a design transfer sheet that is easy to handle can be obtained.

In an embodiment, at least one of the first surface layer and second surface layer contains at least one thermoplastic resin selected from the group consisting of vinyl chloride/vinyl acetate copolymer, polyurethane, polyester, (meth)acrylic resin and phenoxy resin. In the present disclosure, "phenoxy resin" means a thermoplastic polyhydroxy polyether synthesized using a bisphenol and epichlorohydrin, and encompasses those having an epoxy group derived from a tiny amount of epichlorohydrin in the molecule (for example, at the terminal). For example, the epoxy equivalent amount of phenoxy resin is higher than that of epoxy resin, for example, not less than 5,000, not less than 7,000 or not less than 10,000.

In an embodiment, at least one of the first surface layer and second surface layer contains phenoxy resin. A surface layer that contains phenoxy resin has particularly excellent adhesion to a metal brightening layer containing a metal such as tin, indium, or the like.

In an embodiment, at least one of the first surface layer and second surface layer contains phenoxy resin and polyurethane. In a surface layer that contains phenoxy resin and polyurethane, the temperature required for transfer can be reduced because phenoxy resin is plasticized by polyurethane. By enabling transfer of the design transfer sheet at a low transfer temperature in this manner, damage imparted to the design transfer sheet during transfer can be reduced.

The glass transition temperature of the polyurethane contained in the surface layer may be not greater than approximately 60° C., not greater than approximately 40° C., or not greater than approximately 20° C. When mixed or blended with phenoxy resin, polyurethane having a glass transition temperature of not greater than approximately 60° C. can effectively plasticize the phenoxy resin. From the perspective of heat resistance of the surface layer, the glass transition temperature of the polyurethane may be not less than approximately −80° C. The glass transition temperature of the polyurethane may be determined by the same method as the glass transition temperature of the thermoplastic resin.

In an embodiment, the polyurethane is a polyester-based polyurethane. In this embodiment, compatibility of the polyurethane with phenoxy resin is particularly excellent, and component separation of polyurethane and phenoxy resin hardly occurs even when the design transfer sheet is stored for a long period.

In an embodiment, the mass ratio of phenoxy resin and polyurethane resin is from 99:1 to 30:70, from 99:1 to 40:60, from 99:1 to 50:50, from 90:10 to 30:70, from 90:10 to 40:60, from 90:10 to 50:50, from 80:20 to 30:70, from 80:20 to 40:60, or from 80:20 to 50:50. By setting this mass ratio as described, blocking between design transfer sheets that contact each other or between the design transfer sheet and other articles that contact the design transfer sheet can be prevented or reduced.

In one embodiment, at least one of the first surface layer and second surface layer contains a mixture of vinyl chloride/vinyl acetate copolymer and at least one thermoplastic resin selected from the group consisting of polyurethane, polyester, (meth)acrylic resin and phenoxy resin. In this embodiment, the mixing ratio by mass of the vinyl chloride/vinyl acetate copolymer and the thermoplastic resin may be from 20:80 to 80:20.

The thicknesses of the first surface layer and second surface layer are generally not less than approximately 0.2 μm, not less than approximately 0.5 μm, or not less than approximately 0.8 μm, and not more than approximately 100 μm, not more than approximately 50 μm, or not more than approximately 10 μm.

Figure 2:
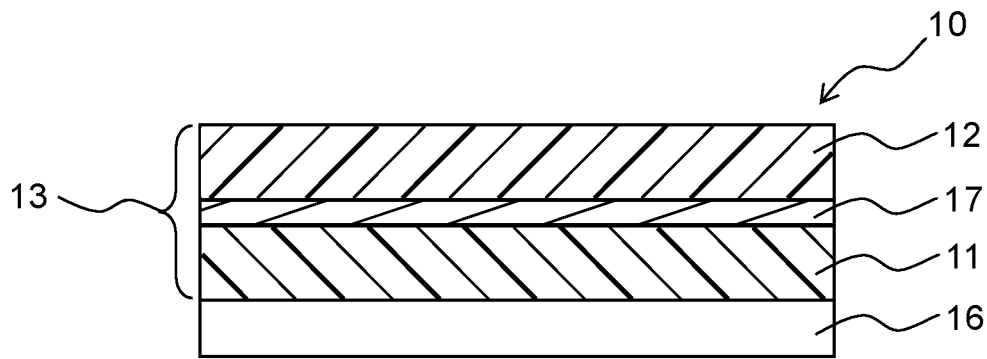
FIG. 2 is a cross-sectional view of a design transfer sheet according to another embodiment of the present disclosure.

In another embodiment, the design transfer layer further includes a design layer between the thermally adherable first surface layer and the thermally adherable second surface layer. FIG. 2 is a cross-sectional view of a design transfer sheet 10 of such an embodiment. The design transfer layer 13 further contains a design layer 17 between the first surface layer 11 and the second surface layer 12.

Examples of the design layer include a color layer that exhibits a paint color, metallic color or the like, a pattern layer that imparts a logo, an image, or a pattern such as a wood grain pattern, stone grain pattern, geometric pattern or leather pattern to the structure, a relief (embossed pattern) layer in which recesses and protrusions are provided on the surface, and combinations thereof.

Pigments that may be used for the color layer by dispersion in a binder resin such as acrylic resin, polyurethane resin or the like are exemplified by inorganic pigments such as titanium oxide, carbon black, chrome yellow, yellow iron oxide, colcothar, red iron oxide, or the like; organic pigments such as phthalocyanine pigments (phthalocyanine blue, phthalocyanine green, or the like), azo lake pigments, indigo pigments, perinone pigments, perylene pigments, quinophthalone pigments, dioxazine pigments, quinacridone pigments (quinacridone red, or the like), or the like; aluminum brightening agents such as aluminum flake, vapor-deposited aluminum flake, metal oxide-coated aluminum flake, colored aluminum flake, or the like; and pearlescent brightening materials such as flake-like mica and synthetic mica coated with a metal oxide such as titanium oxide or iron oxide, or the like.

As a pattern layer, a film, sheet, metal foil, or the like having a pattern, logo, design, or the like formed by printing such as gravure direct printing, gravure offset printing, inkjet printing, laser printing, or screen printing, coating such as gravure coating, roll coating, die coating, bar coating, or knife coating, punching or etching may be used.

As a relief layer, a thermoplastic resin film having a relief form on the surface obtained by a conventional known method such as embossing, scratching, laser processing, dry etching, hot pressing, or the like may be used. A relief layer can be formed by coating a heat-curable or radiation-curable resin such as curable acrylic resin on a release film having a relief form, curing it by heat or radiation, and removing the release film. The thermoplastic resin, heat-curable resin and radiation-curable resin used in the relief layer are not particularly limited, but may be fluorine-based resin, polyester-based resin such as PET and PEN, acrylic resin, polyethylene, polypropylene, thermoplastic elastomer, polycarbonate, polyamide, ABS resin, acrylonitrile/styrene resin, polystyrene, vinyl chloride, polyurethane, and the like.

The design layer may have a variety of thicknesses, and it is generally not less than approximately 0.2 μm, not less than approximately 0.5 μm, or not less than approximately 0.8 μm, and not more than approximately 100 μm, not more than approximately 50 μm, or not more than approximately 10 μm.

The design transfer sheet may be produced using conventional known methods such as printing, coating, lamination, or the like. The method for producing a decorative transfer sheet of one embodiment includes the steps of: preparing a release layer; forming a first surface layer on the release layer by printing by a printing method such as inkjet printing, gravure direct printing, gravure offset printing, or screen printing, or coating such as gravure coating, roll coating, die coating, bar coating, or knife coating, and heat curing as necessary; and forming a second surface layer on the first surface layer, or on another layer formed on the first surface layer, by the same printing methods or coating means as the first surface layer. The method for producing the design transfer sheet may further include a step of forming a design layer on the first surface layer, or on another layer formed on the first surface layer, before forming the second surface layer. The design layer may be formed using the same printing method or coating means as the first surface layer and the second surface layer. At least one of the first surface layer and the second surface layer may be a designable layer that contains pigments, printing inks and the like.

The design transfer layer contained in the design transfer sheet may have a variety of thicknesses, and it is generally not less than approximately 0.4 μm, not less than approximately 1.0 μm, or not less than approximately 1.6 μm, and not more than approximately 200 μm, not more than approximately 100 μm, or not more than approximately 20 μm.

A decorative film can be produced using the design transfer sheet of the present disclosure. One embodiment of the present disclosure provides a method for producing a decorative film, the method including the steps of: preparing a design transfer layer containing a thermally adherable first surface layer and a thermally adherable second surface layer; thermally adhering the first surface layer with a first article; and thermally adhering the second surface layer with a second article. The first article and the second article may also be layers that constitute the decorative film, such as the outermost layer, metal brightening layer, substrate layer or the like described below.

The temperature of thermal adhesion is generally not less than approximately 40° C., not less than approximately 50° C., or not less than approximately 60° C., and not greater than approximately 200° C., not greater than approximately 160° C., or not greater than approximately 140° C. Thermal adhesion may be performed under pressure or not under pressure. The design transfer sheet of one embodiment does not require pressure during thermal adhesion. The design transfer sheet of this embodiment is advantageously used in inline production such as roll-to-roll style or the like because it does not require a pressuring process or device. For example, a relatively thin design transfer layer can generally be thermally adhered easily at atmospheric pressure. The thickness of the design transfer layer contained in the room temperature thermal adhesive design transfer layer may be not less than approximately 0.4 μm, not less than approximately 1.0 μm, or not less than approximately 1.6 μm, and not more than approximately 20 μm, not more than approximately 10 μm, or not more than approximately 5 μm.

Figure 3:
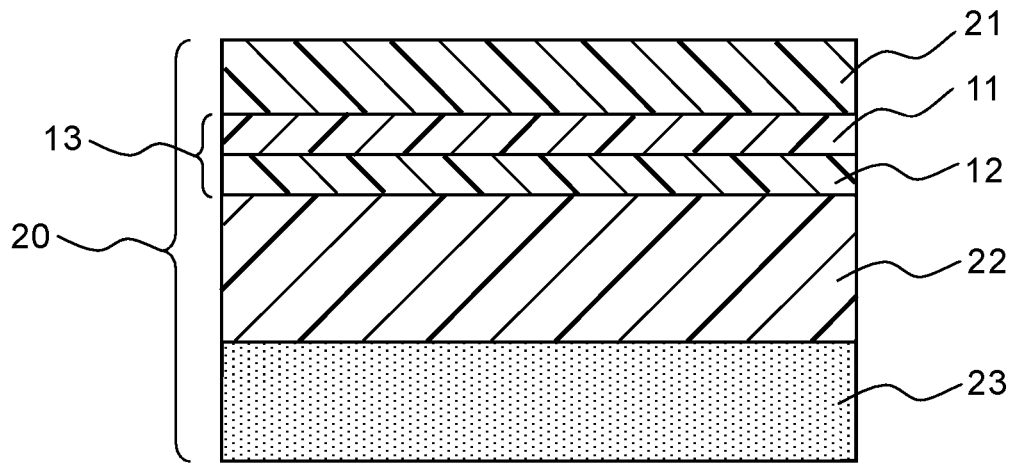
FIG. 3 is a cross-sectional view of a decorative film according to an embodiment of the present disclosure.

One embodiment of the present disclosure provides a decorative film including the design transfer layer, a substrate layer disposed on the side of either the first surface layer or the second surface layer of the design transfer layer, and an outermost layer disposed on the outermost surface on the side of the other of the first surface layer or the second surface layer of the design transfer layer. FIG. 3 is a cross-sectional view of a decorative film 20 of such an embodiment. The decorative film 20 contains a design transfer layer 13 between an outermost layer 21 and a substrate layer 22, and the outermost layer 21 is disposed on the side of the first surface layer 11 of the design transfer layer 13, and the substrate layer 22 is disposed on the side of the second surface layer 12. To mount the decorative film on an article, the decorative film 20 may further contain, as optional elements, supplementary layers such as bonding layers which bond the layers that constitute the decorative film, the adhesive layer 23 and the metal brightening layer, as illustrated in FIG. 3.

As the outermost layer, a variety of resins, for example, acrylic resins such as polymethyl methacrylate (PMMA) and (meth)acrylic copolymer, fluorine resins such as polyurethane, ethylene/tetrafluoroethylene copolymer (ETFE), polyvinylidene fluoride (PVDF), methyl methacrylate/vinylidene fluoride copolymer (PMMA/PVDF), polyolefins such as polyvinyl chloride (PVC), polycarbonate (PC), polyethylene (PE) and polypropylene (PP), polyesters such as polyethylene terephthalate (PET) and polyethylene naphthalate, and copolymers such as ethylene/acrylic acid copolymer (EAA) and ionomers thereof, ethylene/ethyl acrylate copolymer, ethylene/vinyl acetate copolymer and the like can be used. Due to their excellent weather resistance, acrylic resins, polyurethanes, fluorine resins, and polyvinyl chlorides are preferred, and due to their excellent scratch resistance and minimal environmental impact when incinerated or buried as waste, acrylic resins and polyurethanes are more preferred. The outermost layer may also have a multi-layer structure. For example, the outermost layer may be a laminate of films formed from the above resins, or it may by a multi-layer coating of the above resins.

The outermost layer may be formed by coating a resin composition on another layer that constitutes the decorative film, such as a bonding layer or the like. Alternatively, an outermost layer film can be formed by coating the resin composition on a different liner, and that film can be laminated on another layer via a bonding layer. The outermost layer film may also be laminated directly on the design transfer layer without having a bonding layer therebetween. For example, the outermost layer film can be formed by coating resin material such as a curable acrylic resin composition, reactive polyurethane composition or the like on a liner or the like using knife coating, bar coating, blade coating, doctor coating, roll coating, cast coating, and the like, and then heat curing as necessary.

An outermost layer formed into a film beforehand through extrusion, drawing, and the like may be used. This type of film can be laminated on another layer via a bonding layer. The film may also be laminated directly on the design transfer layer without having a bonding layer therebetween. By using a film with high flatness, a structure can be given an appearance of higher surface flatness. Furthermore, the outermost layer can be formed by multi-layer extrusion with other layers. A resin containing polymethyl methacrylate (PMMA), butyl polyacrylate, (meth) acrylic copolymer, ethylene/acrylic copolymer, ethylene vinyl acetate/acrylic copolymer resin, and the like can be formed into a film and used as an acrylic film. An acrylic film has excellent transparency, is resistant to heat and light, and will not easily cause discoloration or luster change when used outdoors. Also, an acrylic film is further characterized by excellent contamination resistance without the use of a plasticizer and the ability to be processed by deep drawing due to excellent moldability. It is particularly preferable to make PMMA the main component.

The outermost layer may have a variety of thicknesses, but it is generally not less than approximately 1 μm, not less than approximately 5 μm, or not less than approximately 10 μm, and not more than approximately 200 μm, not more than approximately 100 μm, or not more than approximately 80 μm. When the decorative film is applied to an article with a complex shape, in terms of shape tracking performance, a thin outermost layer is advantageous; for example, a thickness of not more than approximately 100 μm or not more than approximately 80 μm is preferable. On the other hand, a thick outermost layer is more advantageous in terms of giving the structure high light resistance and/or weather resistance; for example, not less than approximately 5 μm or not less than approximately 10 μm is preferable.

The outermost layer may include, as necessary, ultraviolet absorbers such as benzotriazole, Tinuvin 1130 (manufactured by BASF), and the like, and hindered amine light stabilizers (HALS) such as Tinuvin 292 (manufactured by BASF) and the like. Through the use of ultraviolet absorbers, hindered amine light stabilizers, and the like, discoloration, fading, deterioration, and the like of coloring material, in particular organic pigments that are relatively sensitive to light such as ultraviolet light and the like, included in the design layer and the like can be effectively prevented. The outermost layer may include a hard coating material, a luster-imparting agent, and the like, and may also have an additional hard coating layer. In order to provide an intended appearance, the outermost layer may be transparent, semitransparent, or opaque. It is advantageous if the outermost layer is transparent.

A variety of resins, for example, acrylic resins that include polymethyl methacrylate (PMMA), polyolefins such as polyurethane (PU), polyvinyl chloride (PVC), polycarbonate (PC), acrylonitrile/butadiene/styrene copolymer (ABS), polyethylene (PE), polypropylene (PP), and the like, polyesters such as polyethylene terephthalate (PET), polyethylene naphthalate, and the like, and copolymers such as ethylene/acrylic acid copolymer, ethylene/ethyl acrylate copolymer, ethylene/vinyl acetate copolymer, and the like can be used as a substrate layer. From the perspectives of strength, impact resistance, and the like, polyurethane, polyvinyl chloride, polyethylene terephthalate, acrylonitrile/butadiene/styrene copolymer and polycarbonate can be advantageously used as a substrate layer. A substrate layer is a supporting layer for the design transfer layer, and provides uniform elongation during molding, and can also function as a protective layer that effectively protects the structure from external punctures and impacts. The substrate layer may have a variety of thicknesses, but from the perspective of imparting the above function to the decorative film without adversely affecting the moldability of the decorative film, it is generally not less than approximately 2 µm, not less than approximately 5 µm, or not less than approximately 10 µm, and not more than approximately 500 µm, not more than approximately 200 µm, or not more than approximately 100 µm.

The decorative film may also contain an adhesive layer for mounting the decorative film on an article. Generally used adhesives such as solvent-type, emulsion-type, pressure-sensitive type, heat-sensitive type, and heat-curable or ultraviolet-curable type adhesives, including acrylics, polyolefins, polyurethanes, polyesters, rubbers, and the like can be used as the adhesive layer, and a heat-curable polyurethane adhesive can be advantageously used. The thickness of the adhesive layer is generally not less than approximately 5 µm, not less than approximately 10 µm, or not less than approximately 20 µm, and not more than approximately 200 µm, not more than approximately 100 µm, or not more than approximately 80 µm.

A bonding layer may be used to bond the aforementioned layers. Generally used adhesives such as a solvent-type, emulsion-type, pressure-sensitive type, heat-sensitive type, and heat-curable or ultraviolet-curable type adhesives, including acrylics, polyolefins, polyurethanes, polyesters, rubbers, and the like can be used as the bonding layer, and a heat-curable polyurethane adhesive can be advantageously used. The thickness of the bonding layer is generally not less than approximately 0.05 µm, not less than approximately 0.5 µm, or not less than approximately 5 µm, and not more than approximately 100 µm, not more than approximately 50 µm, or not more than approximately 20 µm.

The decorative film may also contain a metal brightening layer containing a metal such as aluminum, nickel, gold, platinum, chromium, iron, copper, tin, indium, silver, titanium, lead, zinc, or germanium, or alloys or compounds thereof, formed by vacuum deposition, sputtering, ion plating, plating, or the like on a layer that constitutes the decorative film. Because this type of metal brightening layer has high luster, it may be suitably used in a substitute film for chrome plating or the like. In this case, the thickness of the metal brightening layer may be, for example, not less than approximately 5 nm, not less than approximately 10 nm, or not less than approximately 20 nm, and not more than approximately 10 µm, not more than approximately 5 µm, or not more than approximately 2 µm.

Figure 4:
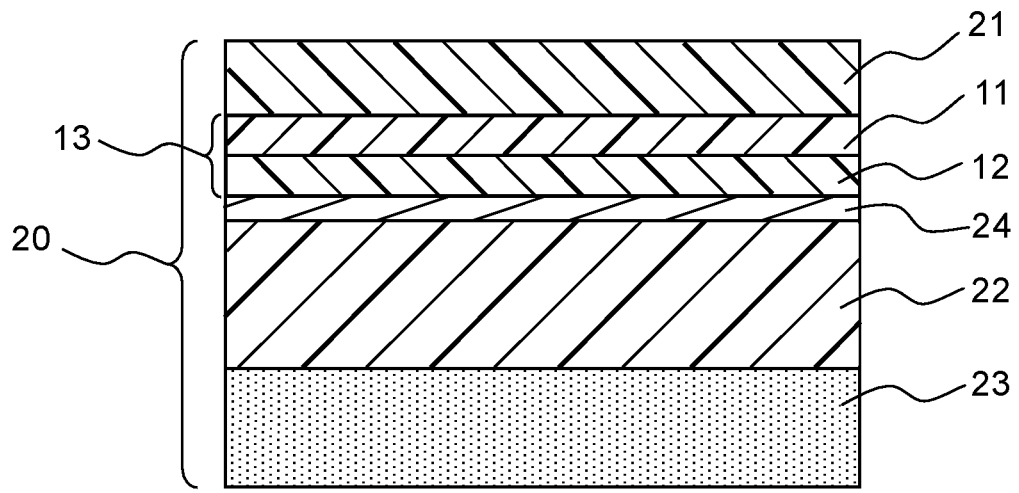
FIG. 4 is a cross-sectional view of a decorative film according to another embodiment of the present disclosure.

Another embodiment provides a decorative film containing a design transfer layer, a metal brightening layer, a substrate layer disposed on the side of either the first surface layer or the second surface layer of the design transfer layer, and an outermost layer disposed on the outermost surface on the side of the other of the first surface layer or the second surface layer of the design transfer layer, of the first surface layer and the second surface layer of the design transfer layer, the layer that contains phenoxy resin being adjacent to the metal brightening layer. FIG. 4 is a cross-sectional view of a decorative film 20 of such an embodiment. The decorative film 20 contains a metal brightening layer between the design transfer layer 13 and the substrate layer 22, and the second surface layer 12 of the design transfer layer 13 contains phenoxy resin and is adjacent to the metal brightening layer. In this embodiment, high inter-layer adhesion of the second surface layer 12 and the metal brightening layer 24 can be achieved.

Figure 5:
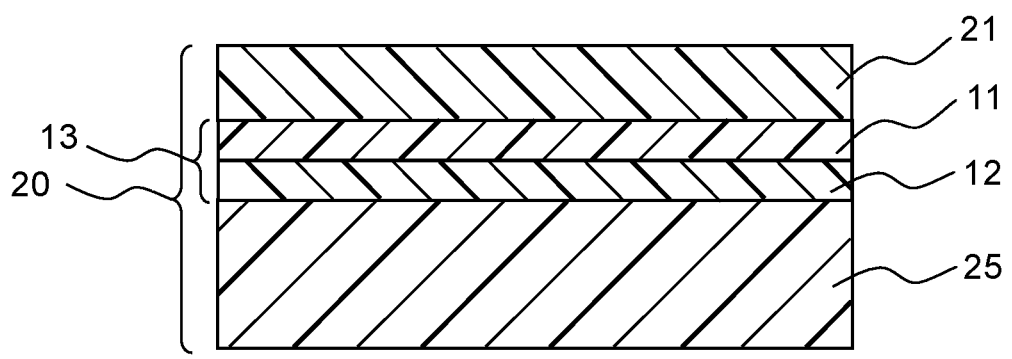
FIG. 5 is a cross-sectional view of a decorative film according to yet another embodiment of the present disclosure.

Yet another embodiment provides a decorative film capable of covering an article having a three-dimensional shape by heat expansion, the decorative film containing the design transfer layer, a polyurethane thermal adhesive layer, which is disposed on the side of either the first surface layer or the second surface layer of the design transfer layer and is thermally adhered to the article during heat expansion, and an outermost layer disposed on the outermost surface on the side of the other of the first surface layer or the second surface layer of the design transfer layer, the polyurethane thermal adhesive layer containing thermoplastic polyurethane selected from the group consisting of polyester-based polyurethanes and polycarbonate-based polyurethanes, and the fracture strength of the polyurethane thermal adhesive layer being not less than 1 MPa at 135° C., and the storage modulus at 150° C. and frequency 1.0 Hz being from $5 \times 10^3$ Pa to $5 \times 10^5$ Pa, and the coefficient of loss tan δ being not less than 0.1. FIG. 5 is a cross-sectional view of a decorative film 20 of such an embodiment. The decorative film 20 contains an outermost layer 21 disposed on the outermost surface on the side of the first surface layer 11 of the design transfer layer 13, and a polyurethane thermal adhesive layer 25 disposed on the side of the second surface layer 12.

The polyurethane thermal adhesive layer functions to adhere the decorative film to the article to which the polyurethane thermal adhesive layer adheres during heat expansion. The polyurethane thermal adhesive layer contains a thermoplastic polyurethane selected from the group consisting of polyester-based polyurethanes and polycarbonate-based polyurethanes. Due to the polyurethane thermal adhesive layer containing such a thermoplastic polyurethane, when used in insert molding (IM) or the three-dimensional overlay method (TOM), excellent adhesion to an article containing polycarbonate (PC), acrylonitrile/butadiene/styrene copolymer (ABS) or a mixture or blend thereof can be achieved without performing primer treatment.

Thermoplastic polyurethane (TPU) is a polymer having a urethane bond in the molecule, generally obtained by a polyaddition reaction of a polyisocyanate such as high-molecular-weight polyol or diisocyanate and a chain extender, using a catalyst such as dibutyltin dilaurate as necessary. When heated, it softens and exhibits fluidity. A hard segment is formed by the reaction of the chain extender and the polyisocyanate, while on the other hand, a soft segment is formed by the reaction of the high-molecular-weight polyol and the polyisocyanate.

Examples of the high-molecular-weight polyol include polyester polyol, polycarbonate polyol and combinations thereof having not less than two hydroxyl groups and having a number average molecular weight of not less than 400. Polyester polyols form polyester-based polyurethanes, and polycarbonate polyols form polycarbonate-based polyurethanes. In the present disclosure, a polyol having both an ester bond and a carbonate bond in the molecule is classified as a polycarbonate polyol. A polyurethane formed by a polyol containing both polyester polyol and polycarbonate polyol is classified as a polycarbonate-based polyurethane. Since there are cases where thermoplasticity is diminished when an excessive crosslinking structure is introduced into a polyurethane, the polyester polyol is preferably a polyester diol, and the polycarbonate polyol is preferably a polycarbonate diol.

Polyester polyol may be obtained by, for example, a condensation reaction or an ester exchange reaction of a short-chain polyol having not less than two hydroxyl groups and having a number average molecular weight of not less than 400 with a polybasic acid or alkyl ester, acid anhydride or acid halide thereof. In addition to the short-chain polyol, a short-chain polyamine having not less than two amino groups and having a number average molecular weight of less than 400 may be involved in the condensation reaction or ester exchange reaction.

Examples of short-chain polyols include dihydric alcohols such as ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 3-methyl-1,5-pentanediol, 2,4-diethyl-1,5-pentanediol, 1,6-hexanediol, 2,6-dimethyl-1-octene-3,8-diol, $C_7$-$C_{22}$ alkane diols, cyclohexanediol, cyclohexane dimethanol, bisphenol A, hydrogenated bisphenol A, 1,4-dihydroxy-2-butene, bishydroxy ethoxy benzene, xylene glycol, bishydroxy ethylene terephthalate, diethylene glycol, trioxyethylene glycol, tetraoxyethylene glycol, pentaoxyethylene glycol, hexaoxyethylene glycol, dipropylene glycol, trioxypropylene glycol, tetraoxypropylene glycol, pentaoxypropylene glycol and hexaoxypropylene glycol; trihydric alcohols such as glycerol, 2-methyl-2-hydroxymethyl-1,3-propanediol, 2,4-dihydroxy-3-hydroxymethyl pentane, 1,2,6-hexanetriol, trimethylol propane and 2,2-bis(hydroxymethyl)-3-butanol; tetrahydric alcohols such as pentaerythritol and diglycerol; pentahydric alcohols such as xylitol; and hexahydric alcohols such as sorbitol, mannitol, allitol, iditol, dulcitol, altritol, inositol and dipentaerythritol, and the like. Short-chain polyols also encompass polyoxyalkylene polyols obtained by adding an alkylene oxide such as ethylene oxide or propylene oxide to these short-chain polyols. Short-chain polyols may be used as one type alone or in a combination of two or more types. Since there are cases where thermoplasticity is diminished when an excessive crosslinking structure is introduced into a polyurethane, a dihydric alcohol is preferably used as the short-chain polyol.

Examples of polybasic acids include saturated aliphatic dicarboxylic acids such as oxalic acid, malonic acid, succinic acid, methylsuccinic acid, glutaric acid, adipic acid, 1,1-dimethyl-1,3-dicarboxypropane, 3-methyl-3-ethyl glutaric acid, azelaic acid and sebacic acid; unsaturated aliphatic dicarboxylic acids such as maleic acid, fumaric acid and itaconic acid; aromatic dicarboxylic acids such as orthophthalic acid, isophthalic acid, terephthalic acid, toluene dicarboxylic acid and naphthalene dicarboxylic acid; alicyclic dicarboxylic acids such as hexahydrophthalic acid; and other polyhydric carboxylic acids such as dimer acids, hydrogenated dimer acids and HET acids. Examples of alkyl esters, acid anhydrides and acid halides of polybasic acids include methyl esters and ethyl esters of the above polybasic acids and the like; oxalic acid anhydride, succinic acid anhydride, maleic acid anhydride, phthalic acid anhydride, 2-$C_{12}$-$C_{18}$ alkyl succinic acid anhydride, tetrahydrophthalic acid anhydride, trimellitic acid anhydride and the like; oxalic acid dichloride, adipic acid dichloride, sebacic acid dichloride and the like. Polybasic acids may be used as one type alone or in a combination of two or more types. Since there are cases where thermoplasticity is diminished when an excessive crosslinking structure is introduced into a polyurethane, a dicarboxylic acid, or alkyl ester, acid anhydride or acid halide thereof is preferably used as the polybasic acid.

Examples of short-chain polyamines include short-chain diamines such as ethylene diamine, 1,3-propane diamine, 1,3-butane diamine, 1,4-butane diamine, 1,6-hexamethylene diamine, 1,4-cyclohexane diamine, 3-aminomethyl-3,5,5-trimethyl cyclohexylamine, 4,4'-dicyclohexylmethane diamine, 2,5(2,6)-bis(aminomethyl)bicyclo[2.2.1]heptane, 1,3-bis(aminomethyl)cyclohexane, hydrazine, and o-, m- or p-tolylene diamine; short-chain triamines such as diethylene triamine; and short-chain polyamines having four or more amino groups such as triethylene tetramine and tetraethylene pentamine. Short-chain polyamines may be used as one type alone or in a combination of two or more types. Since there are cases where thermoplasticity is diminished when an excessive crosslinking structure is introduced into a polyurethane, a short-chain diamine is preferably used as the short-chain polyamine.

Polyester polyols that may be used include vegetable oil-based polyester polyols obtained by condensation reaction of a hydroxycarboxylic acid such as hydroxyl group-containing vegetable oil aliphatic acids; and polycaprolactone polyols and polyvalerolactone polyols obtained by ring-opening polymerization of lactones such as ε-caprolactone and γ-valerolactone and lactides such as L-lactide and D-lactide.

Examples of polycarbonate polyols include ring-opened polymers of ethylene carbonate using a short-chain polyol as an initiator; and amorphous polycarbonate polyols obtained by copolymerizing polycarbonates obtained by reacting the above short-chain dihydric alcohols such as 1,4-butanediol, 1,5-pentanediol, 3-methyl-1,5-pentanediol or 1,6-hexanediol with phosgene or diphenyl carbonate, the above short-chain dihydric alcohols, and the above ring-opened polymers.

Examples of the polyisocyanate include aliphatic polyisocyanates, alicyclic polyisocyanates, aromatic polyisocyanates, aromatic aliphatic polyisocyanates and the like, and multimers (dimers, trimers and the like), biuret-modified products, allophanate-modified products, oxadiazine trione-modified products and carbodiimide-modified products of these polyisocyanates. Polyisocyanates may be used as one type alone or in a combination of two or more types. Since there are cases where thermoplasticity is diminished when an excessive crosslinking structure is introduced into a polyurethane, a diisocyanate is preferably used as the polyisocyanate.

Examples of aliphatic polyisocyanates include ethylene diisocyanate, trimethylene diisocyanate, tetramethylene diisocyanate, pentamethylene diisocyanate (PDI), hexamethylene diisocyanate (HDI), octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecamethylene triisocyanate, 1,3,6-hexamethylene triisocyanate, 1,8-diisocyanate-4-isocyanatomethyloctane, 2,5,7-trimethyl-1,8-diisocyanate-5-isocyanatomethyloctane, bis(isocyanatoethyl)carbonate, bis(isocyanatoethyl)ether, 1,4-butylene glycol dipropyl-ether-ω,ω'-diisocyanate, lysine isocyanatomethyl ester, lysine triisocyanate, 2-isocyanatoethyl-2,6-diisocyanate hexanoate, 2-isocyanatopropyl-2,6-diisocyanate hexanoate, bis(4-isocyanate-n-butylidene)pentaerythritol and 2,6-diisocyanate methylcaproate.

Examples of alicyclic polyisocyanates include isophorone diisocyanate, 1,3-bis(isocyanatomethyl)cyclohexane, trans, trans-, trans,cis- and cis,cis-dicyclohexylmethane -4,4'-diisocyanate and mixtures thereof (hydrogenated MDI), 1,3- or 1,4-cyclohexane diisocyanate and mixtures thereof, 1,3- or 1,4-bis(isocyanatoethyl)cyclohexane, methylcyclohexane diisocyanate, 2,2'-dimethyl dicyclohexylmethane diisocyanate, dimer acid diisocyanate, 2,5-diisocyanatomethyl bicyclo[2.2.1]-heptane, 2,6-diisocyanatomethyl bicyclo[2.2.1]-heptane (NBDI), 2-isocyanatomethyl-2-(3-isocyanatopropyl)-5-isocyanatomethyl bicyclo-[2.2.1]-heptane, 2-isocyanatomethyl-2-(3-isocyanatopropyl)-6-isocyanatomethyl bicyclo-[2.2.1]-heptane, 2-isocyanatomethyl-3-(3-isocyanatopropyl)-5-(2-isocyanatoethyl)-bicyclo-[2.2.1]-heptane, 2-isocyanatomethyl-3-(3-isocyanatopropyl)-6-(2-isocyanatoethyl)-bicyclo-[2.2.1]-heptane, 2-isocyanatomethyl-2-(3-isocyanatopropyl)-5-(2-isocyanatoethyl)-bicyclo-[2.2.1]-heptane, and 2-isocyanatomethyl-2-(3-isocyanatopropyl)-6-(2-isocyanatoethyl)-bicyclo-[2.2.1]-heptane.

Examples of aromatic polyisocyanates include 2,4-tolylene diisocyanate and 2, 6-tolylene diisocyanate, and isomer mixtures of these tolylene diisocyanates (TDI), 4,4'-diphenylmethane diisocyanate, 2,4'-diphenylmethane diisocyanate and 2,2'-diphenylmethane diisocyanate, and isomer mixtures of these diphenylmethane diisocyanates (MDI), toluidine diisocyanate (TODI), paraphenylene diisocyanate and naphthalene diisocyanate (NDI).

Examples of aromatic aliphatic polyisocyanates include 1,3- or 1,4-xylylene diisocyanate or mixtures thereof (XDI), and 1,3- or 1,4-tetramethylxylylene diisocyanate or mixtures thereof (TMXDI).

Examples of chain extenders include dihydric alcohols such as ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 3-methyl-1,5-pentanediol, 2,4-diethyl-1,5-pentanediol, 1,6-hexanediol, 2,6-dimethyl-1-octene-3,8-diol, $C_7$-$C_{22}$ alkane diols, cyclohexanediol, cyclohexane dimethanol, bisphenol A, hydrogenated bisphenol A, 1,4-dihydroxy-2-butene, bishydroxy ethoxy benzene, xylene glycol, bishydroxy ethylene terephthalate, diethylene glycol, trioxyethylene glycol, tetraoxyethylene glycol, pentaoxyethylene glycol, hexaoxyethylene glycol, dipropylene glycol, trioxypropylene glycol, tetraoxypropylene glycol, pentaoxypropylene glycol and hexaoxypropylene glycol; trihydric alcohols such as glycerol, 2-methyl-2-hydroxymethyl-1,3-propanediol, 2,4-dihydroxy-3-hydroxymethyl pentane, 1,2,6-hexanetriol, trimethylol propane and 2,2-bis(hydroxymethyl)-3-butanol; tetrahydric alcohols such as pentaerythritol and diglycerol; pentahydric alcohols such as xylitol; and hexahydric alcohols such as sorbitol, mannitol, allitol, iditol, dulcitol, altritol, inositol, and dipentaerythritol. Chain extenders also encompass polyoxyalkylene polyols obtained by adding an alkylene oxide such as ethylene oxide or propylene oxide to these short-chain polyols. Chain extenders may be used as one type alone or in a combination of two or more types. Since there are cases where thermoplasticity is diminished when an excessive crosslinking structure is introduced into a polyurethane, a dihydric alcohol is preferably used as the chain extender.

The weight average molecular weight of the thermoplastic polyurethane is generally not less than approximately 30,000, not less than approximately 50,000 or not less than approximately 80,000, and not greater than approximately 300,000, not greater than approximately 200,000 or not greater than approximately 150,000. The weight average molecular weight of the thermoplastic polyurethane may be determined by gel permeation chromatography (GPC) using tetrahydrofuran (THF) or N-methylpyrrolidone (NMP) as the solvent, and using standard polystyrene (if the solvent is THF) or standard polymethyl methacrylate (if the solvent is NMP).

In several embodiments, the polyisocyanate that is the main starting material of the thermoplastic polyurethane is incorporated into the thermoplastic polyurethane in an amount of not less than approximately 20 mass %, not less than approximately 22 mass %, or not less than approximately 25 mass %, and not greater than approximately 40 mass %, not greater than approximately 38 mass %, or not greater than approximately 35 mass % relative to the total amount of thermoplastic polyurethane.

As the polyurethane thermal adhesive layer, one obtained by forming thermoplastic polyurethane into film by molding, extrusion, expansion, or the like may be used. Such a film can be laminated on the metal brightening layer, substrate layer, and the like via a bonding layer. Alternatively, if the metal brightening layer, the substrate layer, and the like are adhesive to this film, these layers can be laminated directly onto the film without having a bonding layer therebetween. The design transfer layer may also be laminated directly on the film without having a bonding layer therebetween. The polyurethane thermal adhesive film may also be formed by coating the thermoplastic polyurethane or a solvent-diluted composition containing the components thereof (polyol and polyisocyanate, and catalyst as necessary) on a liner, removing the solvent, and curing if necessary, and that film may be laminated onto a metal brightening layer, substrate layer, or the like with a bonding layer therebetween. If the metal brightening layer, the substrate layer, and the like are adhesive to the polyurethane thermal adhesive layer, these layers can be coated or laminated directly onto the polyurethane thermal adhesive layer without having a bonding layer therebetween. The design transfer layer can also be laminated directly onto the polyurethane thermal adhesive layer without having a bonding layer therebetween. The polyurethane thermal adhesive layer can be formed through multi-layer extrusion with other layers.

The fracture strength of the polyurethane thermal adhesive layer is not less than approximately 1 MPa at 135° C. In several embodiments, the fracture strength of the polyurethane thermal adhesive layer at 135° C. is not less than approximately 2 MPa, not less than approximately 3 MPa, or not less than approximately 5 MPa, and not greater than approximately 50 MPa, not greater than approximately 30 MPa or not greater than approximately 20 MPa. The fracture strength of the polyurethane thermal adhesive layer is the value measured when a test piece fractures when pulled at a pulling rate of 300 mm/minute at temperature 135° C. using a dumbbell test piece of width 10.0 mm and gauge length 20.0 mm according to JIS K 7311 (1995). Due to the fracture strength of the polyurethane thermal adhesive layer being not less than approximately 1 MPa at 135° C., the decorative film can be prevented from fracturing during operations where the pressure changes at high temperature in IM or TOM.

The storage modulus of the polyurethane thermal adhesive layer at 150° C. and frequency 1.0 Hz is not less than approximately $5 \times 10^3$ Pa and not greater than approximately $5 \times 10^5$ Pa. In several embodiments, the storage modulus of the polyurethane thermal adhesive layer at 150° C. and frequency 1.0 Hz is not less than approximately $1 \times 10^4$ Pa or not less than approximately $2 \times 10^4$ Pa, and not greater than approximately $2 \times 10^5$ Pa or not greater than approximately $1 \times 10^5$ Pa. Due to the storage modulus of the polyurethane thermal adhesive layer at 150° C. being in this range, the decorative film can soften to a degree sufficient to adhere to an article without completely losing its shape when heated to the adhesion temperature in IM or TOM.

The coefficient of loss tan δ of the polyurethane thermal adhesive layer is not less than approximately 1.0 at 150° C. and frequency 1.0 Hz. In several embodiments, the coefficient of loss tan δ of the polyurethane thermal adhesive layer at 150° C. and frequency 1.0 Hz is not less than approximately 1.05 or not less than approximately 1.1, and not greater than approximately 5.0 or not greater than approximately 3.0. Due to the coefficient of loss tan δ of the polyurethane thermal adhesive layer at 150° C. and frequency 1.0 Hz being not less than approximately 1.0, the decorative film conforms to the recesses and protrusions of the article surface or has sufficient fluidity to embed such recesses and protrusions when heated to the adhesion temperature in IM or TOM.

In several embodiments, elongation of the polyurethane thermal adhesive layer at 135° C. is not less than approximately 200%, not less than approximately 300%, or not less than approximately 500%, and not greater than approximately 2000%, not greater than approximately 1500%, or not greater than approximately 1000%. The elongation E of the polyurethane thermal adhesive layer is the value obtained from the formula $E (\%)=[(L_1-L_0)/L_0] \times 100$, when the gauge length upon a test piece fracturing when pulled at a pulling rate of 300 mm/minute at temperature 135° C. using a dumbbell test piece of width 10.0 mm and gauge length 20.0 mm is taken as $L_1$ (mm), and the initial gauge length is taken as $L_0$ (mm)=(20.0 mm), according to JIS K 7311 (1995). Due to the elongation of the polyurethane thermal adhesive layer at 135° C. being not less than approximately 200%, the decorative film conforms well even to an article surface with a high radius of curvature in IM or TOM.

In several embodiments, the ratio of the storage modulus at −20° C. and the storage modulus at 110° C. (−20° C. storage modulus/110° C. storage modulus) of the polyurethane thermal adhesive layer measured at frequency 1.0 Hz is not greater than approximately 100, not greater than approximately 80, or not greater than approximately 50, and not less than approximately 1, not less than approximately 2, or not less than approximately 3. Due to the ratio of the storage modulus at −20° C. and the storage modulus at 110° C. of the polyurethane thermal adhesive layer measured at frequency 1.0 Hz being not greater than 100, interface peeling over time between the polyurethane thermal adhesive layer and other layers it contacts, particularly the metal brightening layer, can be prevented.

The polyurethane thermal adhesive layer may have a variety of thicknesses, but it is generally not less than approximately 15 μm, not less than approximately 30 μm, or not less than approximately 50 μm, and not more than approximately 1000 μm, not more than approximately 800 μm, or not more than approximately 500 μm.

In an embodiment, the metal brightening layer is disposed on top of the polyurethane thermal adhesive layer, and the thermoplastic polyurethane contained in the polyurethane thermal adhesive layer is a polycarbonate-based polyurethane. In this embodiment, interlayer adhesion is particularly excellent between the metal brightening layer and the polyurethane thermal adhesive layer.

In one embodiment, the polyurethane thermal adhesive layer also functions as a substrate layer, and the decorative film does not contain an additional substrate layer. The thickness of the polyurethane thermal adhesive layer of this embodiment is, for example, not less than approximately 10 μm, not less than approximately 50 μm, not less than approximately 80 μm, or not less than approximately 100 μm, and not more than approximately 1000 μm, not more than approximately 800 μm, or not more than approximately 500 μm. By this embodiment, a decorative film suitable for IM or TOM can be provided at low cost with a simplified layer structure of the decorative film.

The outermost layer, substrate layer, polyurethane thermal adhesive layer, and/or bonding layer may also include the same coloring material such as inorganic pigments, organic pigments, aluminum brightening material, pearlescent brightening material, and the like described for the design layer. When the area extension percentage of a decorative film having a design layer such as a color layer or the like becomes large, that is, when it expands significantly, the color exhibited by the design layer can change, and the performance of concealing the article to which the polyurethane thermal adhesive layer adheres may be reduced, but by coloring the substrate layer, adhesive layer, polyurethane thermal adhesive layer, and the like placed between the design layer and the article with a pigment such as titanium oxide, zinc oxide, carbon black, or the like, high concealing properties can be realized even when expanded significantly. The area extension percentage is defined as area extension percentage (%)=(B−A)/A (where A is the area of a certain portion of the decorative film before molding, and B is the area of the portion corresponding to A of the decorative film after molding). For example, if the area of a certain portion of the decorative film is 100 cm² before molding and the area of that portion on the surface of the article to which the polyurethane thermal adhesive layer adheres after molding is 250 cm², it is 150%.

In a decorative film containing a metal brightening layer such as a tin vapor deposition film, indium vapor deposition film or the like, such as a decorative film used as a substitute film for chrome plating or the like, performance of concealing the article to which the polyurethane thermal adhesive layer adheres can be improved by incorporating the aforementioned pigments into the substrate layer, adhesive layer, polyurethane thermal adhesive layer and the like. A tin vapor deposition film may have deposition defects such as pinholes in the vapor deposition film surface, but such defects can be made unnoticeable by coloring the substrate layer, adhesive layer, polyurethane thermal adhesive layer, and the like.

It is advantageous if the amount of pigment included in the aforementioned layers is not less than approximately 0.1 mass %, not less than approximately 0.2 mass %, or not less than approximately 0.5 mass %, and not greater than approximately 50 mass %, not greater than approximately 20 mass %, or not greater than approximately 10 mass % of the aforementioned layers.

The thickness of the decorative film is generally not less than approximately 10 μm, not less than approximately 25 μm, or not less than approximately 50 μm, and not more than approximately 2000 μm, not more than approximately 1000 μm, or not more than approximately 500 μm. By the thickness of the decorative film being within the aforementioned range, the decorative film can be made to sufficiently conform to an article with a complex shape, and thus a structure with excellent appearance can be provided.

The scratch resistance of the decorative film can be evaluated through pencil hardness in accordance with JIS K5600-5-4. The pencil hardness of the decorative film of a certain embodiment is 2B or greater when measured by fixing the decorative film on a glass plate with the adhesive layer or polyurethane thermal adhesive layer facing the surface of the glass plate, and then scratching the outermost layer at a speed of 600 mm/min. The pencil hardness may be not below 6B, not below 5B, not below 4B, or not below 3B.

The method for manufacturing the decorative film is not particularly limited. The layers can be manufactured as already described. The decorative film can be manufactured by, for example, forming each layer on a liner such as PET film or the like having a release-treated surface, or on another layer that constitutes the decorative film, and then laminating them. Alternatively, the layers can be sequentially laminated on a single liner by repeating a coating process and, as needed, a drying or curing process. The decorative film may also be formed by multi-layer extrusion of the material of each layer.

The design transfer sheet of the present disclosure may be used in the production of decorative films used for the purpose of decoration of automotive parts, household appliances, railroad cars, building materials, and the like. The obtained decorative film may be advantageously applied to articles using various molding techniques such as IM, TOM, extrusion, and the like.

EXAMPLES

In the following examples, specific embodiments of the present disclosure are exemplified, but the present invention is not restricted thereto. All parts and percentages are by mass unless otherwise indicated.

The reagents, raw materials, and the like used in these examples are shown below in Table 1.

TABLE 1

| Compound name, brand name or abbreviation | Description | Supplier |
|---|---|---|
| Ethylene glycol | | Wako Pure Chemical Industries, Ltd. (Osaka, Japan) |
| 3-methyl-1,5-pentanediol | | Wako Pure Chemical Industries, Ltd. (Osaka, Japan) |
| 2-methyl-1,3-propanediol | | Wako Pure Chemical Industries, Ltd. (Osaka, Japan) |
| 1,4-butanediol | | Wako Pure Chemical Industries, Ltd. (Osaka, Japan) |
| Neopentyl glycol | | Wako Pure Chemical Industries, Ltd. (Osaka, Japan) |
| 1,6-hexanediol | | Wako Pure Chemical Industries, Ltd. (Osaka, Japan) |
| Polylite (TM) OD-X-2640 | Polyester polyol of 1,6-hexanediol/adipic acid, of molecular weight 2000 | DIC Corporation (Chiyoda-ku, Tokyo, Japan) |
| Polylite (TM) OD-X-2692 | Polyester polyol of 2-methyl propanediol/adipic acid, of molecular weight 2000 | DIC Corporation (Chiyoda-ku, Tokyo, Japan) |
| Polylite (TM) OD-X-2610 | Polyester polyol of 1.4-butanediol/adipic acid, of molecular weight 2000 | DIC Corporation (Chiyoda-ku, Tokyo, Japan) |
| Adipic acid | | Wako Pure Chemical Industries, Ltd. (Osaka, Japan) |
| Terephthalic acid | | Wako Pure Chemical Industries, Ltd. (Osaka, Japan) |
| Isophthalic acid | | Wako Pure Chemical Industries, Ltd. (Osaka, Japan) |
| 4,4'-diphenylmethane diisocyanate | | Wako Pure Chemical Industries, Ltd. (Osaka, Japan) |
| Isophorone diisocyanate | | Wako Pure Chemical Industries, Ltd. (Osaka, Japan) |
| Dibutyltin dilaurate | | Wako Pure Chemical Industries, Ltd. (Osaka, Japan) |
| Tetra-n-butyl titanate | | Wako Pure Chemical Industries, Ltd. (Osaka, Japan) |
| YP50S | Phenoxy resin | Nippon Steel & Sumikin Chemical Co., Ltd. (Chiyoda-ku, Tokyo, Japan) |
| G2 | Polyester film, thickness 50 μm | Teijin, Ltd. (Chiyoda-ku, Tokyo, Japan) |
| Technolloy (TM) S000 | Acrylic film, thickness 100 μm | Sumitomo Chemical Co., Ltd. (Chuo-ku, Tokyo, Japan) |
| Technolloy (TM) S014G | Acrylic film, thickness 125 μm | Sumitomo Chemical Co., Ltd. (Chuo-ku, Tokyo, Japan) |
| D6260 | Water-based polyurethane solution | Dainichiseika Color & Chemicals Mfg. Co., Ltd. (Chuo-ku, Tokyo, Japan) |
| E-5XM | Epoxy crosslinking agent (5 mass % solution) | Soken Chemical & Engineering Co., Ltd. (Toshima-ku, Tokyo, Japan) |
| Acrylic polymer A | 30 mass % acrylic copolymer solution of n-butyl acrylate (BA)/acrylic acid (AA) (BA/AA = 94/6 (mass ratio)) | |

TABLE 1-continued

| Compound name, brand name or abbreviation | Description | Supplier |
|---|---|---|
| Acrylic polymer B | 40 mass % acrylic copolymer solution of methyl methacrylate (MMA)/n-butyl methacrylate (BMA)/dimethylaminoethyl methacrylate (DM) (MMA/BMA/DM = 60/34/6 (mass ratio)) | |
| Solbin (TM) C5R | Vinyl chloride/vinyl acetate copolymer (vinyl chloride/vinyl acetate = 80/20 (mass ratio)) | Nissin Chemical Co., Ltd. (Echizen City, Fukui Prefecture, Japan) |
| VTP-NT CD black (A) | Gravure ink | DIC Graphics Corporation (Chiyoda-ku, Tokyo, Japan) |
| Methyl ethyl ketone | | Wako Pure Chemical Industries, Ltd. (Osaka, Japan) |

Production of Polyurethane Film not Having Tin Vapor Deposition Film

Polyurethane solution D6260 was coated on polyester film G2 and dried for 2 minutes at 160° C. to form a polyurethane film 30 μm thick.

Production of Polyurethane Film Having Tin Vapor Deposition Film

Polyurethane solution D6260 was coated on polyester film G2 and dried for 2 minutes at 160° C. to form a polyurethane film 30 μm thick. Using a vacuum vapor deposition machine, metallic tin was vapor-deposited to a thickness of 430 Angstroms on one face of the polyurethane film. Deposition conditions are as follows.

Device: Vacuum vapor deposition device EX-400 (ULVAC, Inc., Chigasaki City, Kanagawa Prefecture, Japan)

Energy source of target metal evaporation: Electron beam

Deposition rate of tin vapor deposition film: 5 Angstroms/second

Production of Acrylic Adhesive Layer 94 parts by mass of n-butyl acrylate (BA) (Mitsubishi Chemical Corporation, Chiyoda-ku, Tokyo, Japan), 6 parts by mass of acrylic acid (AA) (Toagosei Co., Ltd., Minato-ku, Tokyo, Japan), 185.7 parts by mass of ethyl acetate as a solvent, and 0.2 parts by mass of azobis(2,4-dimethylvaleronitrile) (V-65) (Wako Pure Chemical Industries, Ltd., Osaka, Japan) as a polymerization initiator were reacted for 24 hours at 50° C. in a nitrogen atmosphere, to prepare an ethyl acetate solution of acrylic polymer A. The weight average molecular weight of acrylic polymer A was approximately 580,000.

60 parts by mass of methyl methacrylate (MMA) (Mitsubishi Rayon Co., Ltd., Chiyoda-ku, Tokyo, Japan), 34 parts by mass of n-butyl methacrylate (BMA) (Mitsubishi Rayon Co., Ltd., Chiyoda-ku, Tokyo, Japan), 6 parts by mass of dimethylaminoethyl methacrylate (DM) (Mitsubishi Rayon Co., Ltd., Chiyoda-ku, Tokyo, Japan), 150 parts by mass of ethyl acrylate as a solvent, and 0.6 parts by mass of dimethyl-2,2'-azobis(2-methylpropionate) (V-601) (Wako Pure Chemical Industries, Ltd., Osaka, Japan) as a polymerization initiator were reacted for 24 hours at 65° C. in a nitrogen atmosphere, to prepare an ethyl acetate solution of acrylic polymer B. The weight average molecular weight of acrylic polymer B was approximately 96,000.

The solution of acrylic polymer A and the solution of acrylic polymer B were mixed in a solids ratio of 70/30, and as a crosslinking agent, epoxy crosslinking agent E-5XM was further added in an amount of 0.1 mass % by solids ratio relative to total polymer solids. The obtained solution was coated on release-treated polyester film and dried for 5 minutes at 100° C. to form an acrylic adhesive layer 40 μm thick.

Example 1-1 to Example 5 below were performed in order to find a material for the thermally adherable surface layers.

Example 1-1 to Example 1-4

157.5 parts of Polylite™ OD-X-2640, 0.9 parts of 1,4-butanediol, 1.2 parts of 1,6-hexanediol, and 430.1 parts of ethyl acetate were mixed, and a homogeneous solution was prepared. To the obtained solution were added 25.0 parts of 4,4'-diphenylmethane diisocyanate and 0.01 parts of dibutyltin dilaurate, and they were reacted for 24 hours at 80° C. The molecular weight of the obtained polyurethane (PUR1) measured by GPC was number average molecular weight 84,000 and weight average molecular weight 200,000, and the glass transition temperature Tg was −10° C.

PUR1 and methyl ethyl ketone solution of 35 mass % phenoxy resin YP50S were mixed to result in the solids ratios shown in Table 2, and then further diluted with methyl ethyl ketone to adjust the solids to 15%.

The obtained solution was coated onto polyester film G2 using a #12 Meyer bar, and it was dried for 3 minutes at 60° C. to form a thermally adherable surface layer. The thickness of the thermally adherable surface layer measured by a thickness gauge was approximately 4 μm.

The thermally adherable surface layer carried on the polyester film was placed opposing an acrylic film Technolloy™ S000, and a laminate was formed by gluing them using a roll laminator at temperature 130° C. and pressure 2 kgf. The polyester films were peeled from the obtained laminates, and transferability was checked by observing the surface that had been in contact with the polyester film of the thermally adherable surface layer. After that, the exposed thermally adherable surface layer and the polyurethane film not having a tin vapor deposition film or the tin vapor deposition film of the polyurethane film having a tin vapor deposition film were placed facing each other, and two samples for evaluation were formed by gluing them using a roll laminator at temperature 130° C. and pressure 2 kgf. In Example 1-1 to Example 5, the polyurethane film not having a tin vapor deposition film was used in adhesive property evaluation between the thermally adherable surface layer and the polyurethane film, and the polyurethane film having a tin vapor deposition film was used in adhesive property evaluation between the thermally adherable surface layer and the tin vapor deposition film.

Separate from the evaluation samples, the thermally adherable surface layer carried on the polyester film and the tin vapor deposition film of the polyurethane film having a tin vapor deposition film were placed opposing each other, and laminates were formed by gluing them using a roll laminator at temperature 130° C. and pressure 2 kgf. The polyester films were peeled from the obtained laminates, and transferability was checked by observing the surface that had been in contact with the polyester film of the thermally adherable surface layer.

Example 2-1 and Example 2-2

24.0 parts of Polylite™ OD-X-2692, 0.5 parts of 2-methyl-1, 3-propanediol and 56.0 parts of ethyl acetate were mixed, and a homogeneous solution was prepared. To the obtained solution were added 3.92 parts of isophorone diisocyanate and 0.01 parts of dibutyltin dilaurate, and they were reacted for 24 hours at 80° C. The molecular weight of the obtained polyurethane (PUR2) measured by GPC was number average molecular weight 2900 and weight average molecular weight 25,000, and the glass transition temperature Tg was −40° C.

PUR2 and methyl ethyl ketone solution of 35 mass % phenoxy resin YP50S were mixed to result in the solids ratios shown in Table 2, and then further diluted with methyl ethyl ketone to adjust the solids to 15%.

The obtained solution was coated onto polyester film G2 using a #12 Meyer bar, and it was dried for 3 minutes at 60° C. to form a thermally adherable surface layer. The thickness of the thermally adherable surface layer measured by a thickness gauge was approximately 4 μm.

The thermally adherable surface layer carried on the polyester film was placed opposing an acrylic film Technoloy™ S000, and a laminate was formed by gluing them using a roll laminator at temperature 130° C. and pressure 2 kgf. The polyester films were peeled from the obtained laminates, and transferability was checked by observing the surface that had been in contact with the polyester film of the thermally adherable surface layer. After that, the exposed thermally adherable surface layer and the polyurethane film not having a tin vapor deposition film or the tin vapor deposition film of the polyurethane film having a tin vapor deposition film were placed facing each other, and two samples for evaluation were formed by gluing them using a roll laminator at temperature 130° C. and pressure 2 kgf.

Separate from the evaluation samples, the thermally adherable surface layer carried on the polyester film and the tin vapor deposition film of the polyurethane film having a tin vapor deposition film were placed opposing each other, and laminates were formed by gluing them using a roll laminator at temperature 130° C. and pressure 2 kgf. The polyester films were peeled from the obtained laminates, and transferability was checked by observing the surface that had been in contact with the polyester film of the thermally adherable surface layer.

Example 3

100.0 parts of 2-methyl-1,3-propanediol and 130 parts of adipic acid were mixed, and esterification was performed at 200° C. to obtain polyester diol of number average molecular weight 1000. 165 parts of the above polyester diol, 19 parts of 3-methyl-1,5-pentanediol, and 520 parts of ethyl acetate were mixed, and a homogeneous solution was prepared. To the obtained solution were added 40 parts of isophorone diisocyanate and 0.02 parts of dibutyltin dilaurate, and they were reacted for 24 hours at 80° C. The molecular weight of the obtained polyurethane (PUR3) measured by GPC was number average molecular weight 3100 and weight average molecular weight 25,000, and the glass transition temperature Tg was −40° C.

PUR3 and methyl ethyl ketone solution of 35 mass % phenoxy resin YP50S were mixed to result in a solids ratio of 35:65, and this was further diluted with methyl ethyl ketone to adjust the solids to 15%.

The obtained solution was coated onto polyester film G2 using a #12 Meyer bar, and it was dried for 3 minutes at 60° C. to form a thermally adherable surface layer. The thickness of the thermally adherable surface layer measured by a thickness gauge was approximately 4 μm.

The thermally adherable surface layer carried on the polyester film was placed opposing an acrylic film Technoloy™ S000, and a laminate was formed by gluing them using a roll laminator at temperature 130° C. and pressure 2 kgf. The polyester films were peeled from the obtained laminates, and transferability was checked by observing the surface that had been in contact with the polyester film of the thermally adherable surface layer. After that, the exposed thermally adherable surface layer and the polyurethane film not having a tin vapor deposition film or the tin vapor deposition film of the polyurethane film having a tin vapor deposition film were placed facing each other, and two samples for evaluation were formed by gluing them using a roll laminator at temperature 130° C. and pressure 2 kgf.

Separate from the evaluation samples, the thermally adherable surface layer carried on the polyester film and the tin vapor deposition film of the polyurethane film having a tin vapor deposition film were placed opposing each other, and laminates were formed by gluing them using a roll laminator at temperature 130° C. and pressure 2 kgf. The polyester films were peeled from the obtained laminates, and transferability was checked by observing the surface that had been in contact with the polyester film of the thermally adherable surface layer.

Example 4

90.0 parts of Polylite™ OD-X-2610 and 233.33 parts of methyl ethyl ketone were mixed, and a homogeneous solution was prepared. To the obtained solution were added 10.0 parts of 4,4'-diphenylmethane diisocyanate and 0.01 parts of dibutyltin dilaurate, and they were reacted for 24 hours at 80° C. The molecular weight of the obtained polyurethane measured by GPC was weight average molecular weight 16,000. A mixture of 77 parts of the above 30 mass % polyurethane solution and 77 parts of Solbin™ C5R was diluted by adding 206 parts of methyl ethyl ketone and 40 parts of isopropyl alcohol, and a homogeneous solution was obtained. The obtained solution was coated onto polyester film G2 using a #12 Meyer bar, and it was dried for 3 minutes at 60° C. to form a thermally adherable surface layer of Example 4. The thickness of the thermally adherable surface layer measured by a thickness gauge was approximately 4 μm.

The thermally adherable surface layer carried on the polyester film was placed opposing an acrylic film Technoloy™ S000, and a laminate was formed by gluing them using a roll laminator at temperature 130° C. and pressure 2 kgf. The polyester films were peeled from the obtained laminates, and transferability was checked by observing the surface that had been in contact with the polyester film of the thermally adherable surface layer. After that, the exposed thermally adherable surface layer and the polyurethane film not having a tin vapor deposition film or the tin vapor deposition film of the polyurethane film having a tin vapor deposition film were placed facing each other, and two samples for evaluation were formed by gluing them using a roll laminator at temperature 130° C. and pressure 2 kgf.

Separate from the evaluation samples, the thermally adherable surface layer carried on the polyester film and the polyurethane film not having a tin vapor deposition film were placed opposing each other, and a laminate was formed by gluing them using a roll laminator at temperature 130° C. and pressure 2 kgf. The polyester films were peeled from the obtained laminates, and transferability was checked by observing the surface that had been in contact with the polyester film of the thermally adherable surface layer.

Example 5

26 parts of terephthalic acid, 26 parts of isophthalic acid, 16 parts of adipic acid, 18 parts of 1, 6-hexanediol, 9 parts of neopentyl glycol, 4 parts of ethylene glycol, and 0.03 parts of tetra-n-butyl titanate were put in a stainless steel autoclave equipped with an agitator, a thermometer and a partially circulating cooler, the temperature was raised from 160° C. to 220° C. over the course of 4 hours, and an esterification reaction was performed. Then, the temperature was raised to 255° C., and after gradually decreasing the pressure of the reaction system, it was reacted for 60 minutes under reduced pressure of 0.5 mmHg. The molecular weight of the obtained polyester measured by GPC was weight average molecular weight 87,000. 45 parts of the above polyester and 55 parts of Solbin™ C5R were dissolved in 400 parts of methyl ethyl ketone, and a homogeneous solution was obtained. The obtained solution was coated onto polyester film G2 using a #12 Meyer bar, and it was dried for 3 minutes at 60° C. to form a thermally adherable surface layer of Example 5. The thickness of the thermally adherable surface layer measured by a thickness gauge was approximately 4 µm.

The thermally adherable surface layer carried on the polyester film was placed opposing an acrylic film Technolloy™ S000, and a laminate was formed by gluing them using a roll laminator at temperature 130° C. and pressure 2 kgf. The polyester films were peeled from the obtained laminates, and transferability was checked by observing the surface that had been in contact with the polyester film of the thermally adherable surface layer. After that, the exposed thermally adherable surface layer and the polyurethane film not having a tin vapor deposition film or the tin vapor deposition film of the polyurethane film having a tin vapor deposition film were placed facing each other, and two samples for evaluation were formed by gluing them using a roll laminator at temperature 130° C. and pressure 2 kgf.

Separate from the evaluation samples, the thermally adherable surface layer carried on the polyester film and the polyurethane film not having a tin vapor deposition film were placed opposing each other, and a laminate was formed by gluing them using a roll laminator at temperature 130° C. and pressure 2 kgf. The polyester films were peeled from the obtained laminates, and transferability was checked by observing the surface that had been in contact with the polyester film of the thermally adherable surface layer.

The thermally adherable surface layers and evaluation samples were evaluated by the following procedures.
Molecular Weight of Polyurethanes PUR1 to PUR3
The molecular weight of polyurethane is determined by gel permeation chromatography (GPC) under the following conditions.

Device: Agilent 1200 series LC system
PL Gel Guard Column (50 mm×7.5 mm, inside diameter 10 µm)
PL Gel Mixed-B×2 (300 mm×7.5 mm, inside diameter 10 µm)
Solvent: Tetrahydrofuran (THF) or N-methylpyrrolidone (NMP)
Flow rate: 1.0 mL/minute
Detector: RI
Column temperature: 40° C. (THF), 60° C. (NMP)
Concentration: 0.1%
Sample quantity: 100 µL
Standard: Polystyrene (THF), polymethyl methacrylate (NMP)
Glass Transition Temperature Tg of Thermally Adherable Surface Layers The glass transition temperature is measured using an ARES dynamic viscoelasticity measuring device (manufactured by T.A. Instruments Japan, Shinagawa-ku, Tokyo, Japan). Specimens are produced by punching the thermally adherable surface layer to a diameter of 7.9 mm, and the glass transition temperature is determined as the peak temperature of the coefficient of loss tan δ (=shear loss modulus G"/shear storage modulus G') obtained by measuring shear storage modulus G' and shear loss modulus G" every 12 seconds in shear mode at frequency 1.0 Hz, while raising the temperature from −60° C. to 200° C. at a heating rate of 5° C./minute.
Viscoelasticity Characteristics of Thermally Adherable Surface Layers Viscoelasticity characteristics are measured using an ARES dynamic viscoelasticity measuring device (manufactured by T.A. Instruments Japan, Shinagawa-ku, Tokyo, Japan). Specimens are produced by punching the thermally adherable surface layer to a diameter of 7.9 mm, and the shear storage modulus G' is obtained by measuring in shear mode at frequency 1.0 Hz at prescribed temperatures (50° C. and 100° C.).
Adhesive Property Evaluation Adhesive property is evaluated based on the cross-cut tape test of JIS K5400: 1990 (out of print). Specifically, the polyester film is peeled from the evaluation sample, and an acrylic adhesive layer is glued on top of a polyurethane film having or not having a tin vapor deposition film at temperature 60° C. and pressure 2 kgf. Using TOM, the sample is glued to a PC/ABS sheet (CK43 black, manufactured by TechnoPolymer Co., Ltd., Minato-ku, Tokyo, Japan) such that the area extension percentage at molding temperature 135° C. is 100%, and then, using a cutter, slits are made in the film in a cross-cut pattern at 1 mm intervals to form 100 segments. Sellotape™ (CT405AP-18, manufactured by Nichiban Co., Ltd., Bunkyo-ku, Tokyo, Japan) is pressed on top of the film in which slits were made in a cross-cut pattern, and is then pulled in the 90-degree direction. The number of cross-cut segments remaining on the film is counted and used as the value of adhesive property evaluation. If the number of remaining segments is 100 (100/100), it is evaluated as "best," and if 90 or more (90/100 or more), it is evaluated as "good."
Transferability Evaluation Transferability is evaluated visually. If the surface of the transferred thermally adherable surface layer is smooth, it is evaluated as "good"; if the surface of the transferred thermally adherable surface layer is partially rough, it is "acceptable"; if there is an untransferred portion on the surface of the transferred thermally adherable surface layer, it is evaluated as "unacceptable."

Blocking Property Evaluation

Polyester film G2 is placed on the thermally adherable surface layer carried on polyester film, and this is stored for 24 hours at 40° C. under a load of 2.5 kg/25 cm², and then the state of blocking (attachment) is checked. If the thermally adherable surface layer and the polyester film peel easily, it is evaluated as "good"; if the thermally adherable surface layer partially lifts when the polyester film is peeled from the thermally adherable surface layer, it is "acceptable"; if the thermally adherable surface layer sticks to the polyester film, it is evaluated as "unacceptable."

The evaluation results of the thermally adherable surface layers and evaluation samples of Example 1-1 to Example 5 are shown in Table 2 and Table 3.

esterification reaction was performed. Then, the temperature was raised to 255° C., and after gradually decreasing the pressure of the reaction system, it was reacted for 60 minutes under reduced pressure of 0.5 mmHg. The molecular weight of the obtained polyester measured by GPC was weight average molecular weight 87,000. 45 parts of the above polyester and 55 parts of Solbin™ C5R were dissolved in 400 parts of methyl ethyl ketone, and a homogeneous solution was obtained. The obtained solution was coated onto polyester film G2 using a #12 Meyer bar, and it was dried for 3 minutes at 60° C. to form a thermally adherable first surface layer. The thickness of the thermally adherable first surface layer measured by a thickness gauge was approximately 2 μm.

TABLE 2

|  | Example 1-1 | Example 1-2 | Example 1-3 | Example 1-4 | Example 2-1 | Example 2-2 | Example 3 |
|---|---|---|---|---|---|---|---|
| YP50S | 100 | 65 | 35 |  | 65 |  | 65 |
| PUR1 |  | 35 | 65 | 100 |  |  |  |
| PUR2 |  |  |  |  | 35 | 100 |  |
| PUR3 |  |  |  |  |  |  | 35 |
| Tg (° C.) | 80° C. | 50° C. | 5° C. | −10° C. | 50° C. | −40° C. | 50° C. |
| Storage modulus at 50° C. (Pa) | $2.1 \times 10^8$ | $1.1 \times 10^7$ | $4.0 \times 10^6$ | $8.7 \times 10^5$ | $1.3 \times 10^7$ | $1.0 \times 10^6$ | $1.9 \times 10^7$ |
| Storage modulus at 100° C. (Pa) | $1.9 \times 10^6$ | $6.2 \times 10^5$ | $4.2 \times 10^5$ | $3.3 \times 10^5$ | $4.2 \times 10^5$ | $3.9 \times 10^5$ | $4.7 \times 10^5$ |
| Blocking | Good | Good | Acceptable | Poor | Good | Poor | Good |
| Transferability (acrylic film) | Good | Good | Good | Acceptable | Good | Acceptable | Good |
| Transferability (tin vapor deposition film) | Good | Good | Good | Acceptable | Good | Acceptable | Good |
| Adhesive property (polyurethane film) | 100/100[a] | 100/100[a] | 100/100[a] | 100/100[a] | 100/100[a] | 100/100[a] | 100/100[a] |
| Adhesive property (tin vapor deposition film) | 100/100[a] | 100/100[a] | 92/100[b] | 79/100[b] | 100/100[a] | 52/100[b] | 100/100[a] |

[a]Peeling between tape and acrylic film, interlayer peeling not confirmed
[b]Peeling between tin vapor deposition film and thermally adherable surface layer

TABLE 3

|  | Example 4 | Example 5 |
|---|---|---|
| Thermally adherable surface layer | Mixture of vinyl chloride/vinyl acetate copolymer and polyester-based polyurethane | Mixture of vinyl chloride/vinyl acetate copolymer and polyester |
| Tg(° C.) | 50° C. | 50° C. |
| Storage modulus at 50° C. (Pa) | $6.4 \times 10^6$ | $5.3 \times 10^6$ |
| Storage modulus at 100° C. (Pa) | $3.3 \times 10^5$ | $7.9 \times 10^4$ |
| Blocking | Good | Good |
| Transferability (acrylic film) | Acceptable | Acceptable |
| Transferability (polyurethane film) | Acceptable | Acceptable |
| Adhesive property (polyurethane film) | 100/100[a] | 100/100[a] |
| Adhesive property (tin vapor deposition film) | 0/100[b] | 0/100[b] |

[a]Peeling between tape and acrylic film, interlayer peeling not confirmed
[b]Peeling between tin vapor deposition film and thermally adherable surface layer Example 6

26 parts of terephthalic acid, 26 parts of isophthalic acid, 16 parts of adipic acid, 18 parts of 1, 6-hexanediol, 9 parts of neopentyl glycol, 4 parts of ethylene glycol, and 0.03 parts of tetra-n-butyl titanate were put in a stainless steel autoclave equipped with an agitator, a thermometer and a partially circulating cooler, the temperature was raised from 160° C. to 220° C. over the course of 4 hours, and an PUR2 and methyl ethyl ketone solution of 35 mass % phenoxy resin YP50S were mixed to result in a solids ratio of 35:65, and this was further diluted with methyl ethyl ketone to adjust the solids to 7.5%. The obtained solution was coated onto the first surface layer using a #12 Meyer bar, and it was dried for 3 minutes at 60° C. to form a thermally adherable second surface layer. The thickness of the thermally adherable second surface layer measured by a thickness gauge was approximately 2 μm.

In this manner, a design transfer sheet of Example 6, containing a polyester film (release layer) and a design transfer layer releasably mounted on the polyester film, was produced. The design transfer layer contained, in order from the polyester film side, a first surface layer and a second surface layer.

The second surface layer of the design transfer layer and the polyurethane film not having a tin vapor deposition film or the tin vapor deposition film of the polyurethane film having a tin vapor deposition film were placed facing each other, and laminates were formed by gluing them using a roll laminator at temperature 130° C. and pressure 2 kgf. The polyester films were peeled from the obtained laminates, and the exposed first surface layer and an acrylic film Technolloy™ S000 were placed opposing each other, and two types of evaluation sample were produced by gluing them using a roll laminator at temperature 130° C. and pressure 2 kgf.

Blocking and adhesive property were evaluated in the same manner as Example 1-1. Blocking was good when performed by placing the polyester film G2 on the second surface layer of the design transfer sheet. When performed using a PC/ABS sheet (CK43 black, manufactured by TechnoPolymer Co., Ltd., Minato-ku, Tokyo, Japan) as the object adhered to, the adhesion property was 100/100 for both the polyurethane film not having a tin vapor deposition film and the polyurethane film having a tin vapor deposition film. In the adhesive property evaluation, peeling occurred between the tape and the acrylic film, and no interlayer peeling was seen.

Example 7

PUR2 and methyl ethyl ketone solution of 35 mass % phenoxy resin YP50S were mixed to result in a solids ratio of 35:65, and this was further diluted with methyl ethyl ketone to adjust the solids to 7.5%. The obtained solution was coated onto polyester film G2 using a #12 Meyer bar, and it was dried for 3 minutes at 60° C. to form a thermally adherable first surface layer. The thickness of the thermally adherable first surface layer measured by a thickness gauge was approximately 2 μm.

On the first surface layer, gravure ink VTP-NT CD black (A) was printed in a prescribed pattern using gravure printing to form a design layer. The thickness of the design layer measured by a thickness gauge was approximately 2 μm.

The same solution as the first surface layer was coated onto the design layer using a #12 Meyer bar, and it was dried for 3 minutes at 60° C. to form a thermally adherable second surface layer. The thickness of the thermally adherable second surface layer measured by a thickness gauge was approximately 2 μm.

In this manner, a design transfer sheet of Example 7, containing a polyester film (release layer) and a design transfer layer releasably mounted on the polyester film, was produced. The design transfer layer contained, in order from the polyester film side, a first surface layer, a design layer and a second surface layer.

The second surface layer of the design transfer layer and the polyurethane film not having a tin vapor deposition film or the tin vapor deposition film of the polyurethane film having a tin vapor deposition film were placed facing each other, and laminates were formed by gluing them using a roll laminator at temperature 130° C. and pressure 2 kgf. The polyester films were peeled from the obtained laminates, and the exposed first surface layer and an acrylic film Technolloy™ S000 were placed opposing each other, and two types of evaluation sample were produced by gluing them using a roll laminator at temperature 130° C. and pressure 2 kgf.

Blocking and adhesive property were evaluated in the same manner as Example 1-1. Blocking was good when performed by placing the polyester film G2 on the second surface layer of the design transfer sheet. When performed using a PC/ABS sheet (CK43 black, manufactured by TechnoPolymer Co., Ltd., Minato-ku, Tokyo, Japan) as the object adhered to, the adhesion property was 100/100 for both the polyurethane film not having a tin vapor deposition film and the polyurethane film having a tin vapor deposition film. In the adhesive property evaluation, peeling occurred between the tape and the acrylic film, and no interlayer peeling was seen.

Example 8

PUR1 and methyl ethyl ketone solution of 35 mass % phenoxy resin YP50S were mixed to result in a solids ratio of 35:65, and this was further diluted with methyl ethyl ketone to adjust the solids to 7.5%. The obtained solution was coated onto polyester film G2 using a #12 Meyer bar, and it was dried for 3 minutes at 60° C. to form a thermally adherable first surface layer. The thickness of the thermally adherable first surface layer measured by a thickness gauge was approximately 2 μm.

On the first surface layer, gravure ink VTP-NT CD black (A) was printed in a prescribed pattern using gravure printing to form a design layer. The thickness of the design layer measured by a thickness gauge was approximately 2 μm.

The same solution as the first surface layer was coated onto the design layer using a #12 Meyer bar, and it was dried for 3 minutes at 60° C. to form a thermally adherable second surface layer. The thickness of the thermally adherable second surface layer measured by a thickness gauge was approximately 2 μm.

In this manner, a design transfer sheet of Example 8, containing a polyester film (release layer) and a design transfer layer releasably mounted on the polyester film, was produced. The design transfer layer contained, in order from the polyester film side, a first surface layer, a design layer and a second surface layer.

Polyurethane films that could be used as the polyurethane thermal adhesive layer were prepared by the following procedures. Polyester polyol of number average molecular weight 500 was prepared by adding 40 ppm of titanium tetrabutyrate as a catalyst to 21.6 parts of adipic acid and 29.6 parts of 1,4-butanediol, and performing an esterification reaction at 240° C. 56.0 parts of the above polyester polyol, 15.0 parts of Kuraray polyol PMHC-1050, 2.0 parts of 1,6-hexanediol, 27.0 parts of hexamethylene diisocyanate and 0.01 parts of dibutyltin dilaurate were mixed, and after reacting for 3 hours at 180° C., a film 100 μm thick was produced using a compression molder. The molecular weight of the obtained polyurethane measured by GPC was number average molecular weight 46,000 and weight average molecular weight 120,000.

Using a vacuum vapor deposition machine, metallic tin was vapor-deposited to a thickness of 430 Angstroms on one face of a polyurethane film. In this manner, both a polyurethane film having a tin vapor deposition film and a polyurethane film not having a tin vapor deposition film were prepared.

Deposition conditions are as follows.
Device: Vacuum vapor deposition device EX-400 (ULVAC, Inc., Chigasaki City, Kanagawa Prefecture, Japan)
Energy source of target metal evaporation: Electron beam
Deposition rate of tin vapor deposition film: 5 Angstroms/second The second surface layer of the design transfer layer and the polyurethane film not having a tin vapor deposition film or the tin vapor deposition film of the polyurethane film having a tin vapor deposition film were placed facing each other, and laminates were formed by gluing them using a roll laminator at temperature 130° C. and pressure 2 kgf. The polyester films were peeled from the obtained laminates, and the exposed first surface layer and an acrylic film Technolloy™ S014G were placed facing each other, and two types of evaluation sample were produced by gluing them using a roll laminator at temperature 130° C. and pressure 2 kgf.

The adhesive property was evaluated in the same manner as Example 1-1 except that a polyurethane film was put in contact with a PC/ABS sheet (CK43 black, TechnoPolymer Co., Ltd., Minato-ku, Tokyo, Japan) directly without using an acrylic adhesion layer, and the evaluation sample was glued to the PC/ABS sheet. The appearance of the samples produced for use in adhesive property evaluation was good. The adhesive property was 100/100 for both the polyurethane film not having a tin vapor deposition film and the polyurethane film having a tin vapor deposition film. In the adhesive property evaluation, peeling occurred between the tape and the acrylic film, and no interlayer peeling was seen.

Samples for adhesive property evaluation were prepared in the same manner as above. The obtained samples were put in a 110° C. oven for 500 hours and then removed and left to stand for 1 day at room temperature, after which appearance and adhesive property were evaluated in the same manner. The appearance of the samples after the heated acceleration test was good, and when adhesive property was tested, it was 100/100 for both the polyurethane film not having a tin vapor deposition film and the polyurethane film having a tin vapor deposition film. In the adhesive property evaluation, peeling occurred between the tape and the acrylic film, and no interlayer peeling was seen.

What is claimed is:

1. A design transfer sheet comprising:
    a release layer; and
    a design transfer layer releasably mounted on the release layer,
    with the design transfer layer including a thermally adherable first surface layer and a thermally adherable second surface layer in that order from the release layer side,
    wherein the first surface layer or the second surface layer or both has a design, or a design layer is disposed between the first surface layer and the second surface layer, and wherein at least one of the first surface layer and the second surface layer contains phenoxy resin and polyurethane, wherein the polyurethane has a glass transition temperature of not greater than 40° C.

2. The design transfer sheet according to claim 1, wherein at least one of the first surface layer and the second surface layer contains at least one thermoplastic resin selected from the group consisting of vinyl chloride/vinyl acetate copolymer, polyurethane, polyester, (meth)acrylic resin and phenoxy resin.

3. The design transfer sheet according to claim 1, wherein the polyurethane is polyester-based polyurethane.

4. The design transfer sheet according to claim 1, wherein the mass ratio of the phenoxy resin and the polyurethane is from 99:1 to 30:70.

5. A decorative film comprising:
    the design transfer layer described in claim 1;
    a metal brightening layer;
    a substrate layer disposed on the side of either the first surface layer or the second surface layer of the design transfer layer; and an outermost layer disposed on the outermost surface on the side of the other of the first surface layer or the second surface layer of the design transfer layer; of the first surface layer and the second surface layer of the design transfer layer, the layer that contains phenoxy resin being adjacent to the metal brightening layer.

6. A decorative film comprising: a design transfer layer comprising a thermally adherable first surface layer and a thermally adherable second surface layer, wherein the first surface layer or the second surface layer or both has a design, or a design layer is disposed between the first surface layer and the second surface layer; a substrate layer disposed on the side of either the first surface layer or the second surface layer of the design transfer layer; and an outermost layer disposed on the outermost surface on the side of the other of the first surface layer or the second surface layer of the design transfer layer, wherein the outermost layer comprises an acrylic resin, fluorine resin, polyvinyl chloride, polyurethane, polyolefin, or a copolymer or ionomer thereof, and wherein the outermost layer is capable of being processed by deep drawing.

\* \* \* \* \*